(12) United States Patent
Nishioka et al.

(10) Patent No.: US 8,401,356 B2
(45) Date of Patent: Mar. 19, 2013

(54) OPTICAL CONNECTOR ASSEMBLING JIG AND OPTICAL CONNECTOR ASSEMBLING METHOD

(75) Inventors: Daizo Nishioka, Yokohama (JP);
Takayasu Yamauchi, Yokohama (JP);
Yukihiro Yokomachi, Yokohama (JP);
Yoshinobu Toda, Yokohama (JP);
Yoshio Ukita, Komaki (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 261 days.

(21) Appl. No.: 12/991,660

(22) PCT Filed: Apr. 30, 2009

(86) PCT No.: PCT/JP2009/058442
§ 371 (c)(1),
(2), (4) Date: Nov. 8, 2010

(87) PCT Pub. No.: WO2009/136583
PCT Pub. Date: Nov. 12, 2009

(65) Prior Publication Data
US 2011/0056246 A1    Mar. 10, 2011

(30) Foreign Application Priority Data

May 9, 2008  (JP) .................................. 2008-123631

(51) Int. Cl.
*G02B 6/00* (2006.01)
(52) U.S. Cl. ....................................................... 385/134
(58) Field of Classification Search ................... 385/134
See application file for complete search history.

(56) References Cited

U.S. PATENT DOCUMENTS

| 7,280,733 B2 * | 10/2007 | Larson et al. ................. 385/139 |
| 7,731,429 B2 | 6/2010 | Ohtsuka et al. |

(Continued)

FOREIGN PATENT DOCUMENTS

| CN | 1969212 A | 5/2007 |
| JP | 2002-071999 A | 3/2002 |

(Continued)

OTHER PUBLICATIONS

Chinese Office Action of the corresponding Chinese Application No. 200980116149.3, dated Aug. 3, 2012.

(Continued)

*Primary Examiner* — Omar Rojas
(74) *Attorney, Agent, or Firm* — Global IP Counselors, LLP

(57) ABSTRACT

An optical connector assembling jig and an optical connector assembling method includes an optical connection. The optical connector assembling jig includes a base and a guide. The base is provided in a longitudinal direction with an accommodation groove for accommodating an optical fiber, and a rear pressing member for restraining a rear part of the optical fiber accommodated in the accommodation groove. The rear part is set apart from an embedded fiber. The guide has a front holding portion for holding a front part of the optical fiber accommodated in the accommodation groove. The front part is near the embedded fiber, and the guide is capable of moving in the longitudinal direction. Moving the base toward the optical connector causes the intermediate section of the optical fiber to separate from the accommodation groove and bend. By moving the base further toward the optical connector, a buffered fiber in the optical fiber can be connected to the embedded fiber.

4 Claims, 16 Drawing Sheets

U.S. PATENT DOCUMENTS

2007/0104445 A1 5/2007 Larson et al.
2008/0107381 A1 5/2008 Nishioka et al.

FOREIGN PATENT DOCUMENTS

| | | |
|---|---|---|
| JP | 2006-058400 A | 3/2006 |
| JP | 2007-121863 A | 5/2007 |
| JP | 2007-121878 A | 5/2007 |
| JP | 2007-121886 A | 5/2007 |
| JP | 2007-156331 A | 6/2007 |
| JP | 2007-163763 A | 6/2007 |
| JP | 2008-046219 A | 2/2008 |
| WO | WO-2007/050470 A1 | 5/2007 |

OTHER PUBLICATIONS

International Search Report of International Application No. PCT/JP2009/058442, dated Jun. 2, 2009.

English translation of PCT/ISA/237 issued in PCT/JP2009/058442.

* cited by examiner

OPTICAL CONNECTOR ASSEMBLING JIG AND OPTICAL CONNECTOR ASSEMBLING METHOD

TECHNICAL FIELD

The present invention relates to a jig and a method for performing mechanical splicing to assemble a second optical fiber with an optical connector having an embedded fiber (a first optical fiber).

BACKGROUND ART

The demand for high-speed data communication has been increasing of late as Internet use becomes more widespread, and fiber-to-the-home (FTTH) services, in which optical fibers are laid to individual homes, are also expanding. It is expected that optical connectors will be used in typical homes as well. For example, an optical connector is attached to an end of an optical fiber cord connected to optical communication equipment, and a plug of the optical connector is inserted into an optical connection adapter provided in the wall, so that the optical communication equipment in the home is connected to the FTTH network.

Japanese Laid-open Patent Application No. 2002-71999 discloses an optical connector assembling jig and method used with such applications. FIG. 16 is a schematic view of a conventional optical connector assembling jig 100. In the assembling jig 100, pressing an operation button 101 enables an optical fiber 103 held in a holder 102 to be moved to a mechanical splicer arranging portion 104.

In the assembling jig 100, gripping the operation button 101 with one hand enables a connection between an embedded fiber and the optical fiber 103 to be readily achieved. However, if too little pressure is used during the connection, it is difficult achieve a reliable optical connection between the embedded fiber and the optical fiber 103. In cases in which the optical fiber 103 is a thick buffered fiber having a diameter of 0.9 mm, the optical fiber 103 can break, and the fiber is not readily inserted so that a suitable amount of pressure (e.g., 0.2 N) is maintained.

DISCLOSURE OF THE INVENTION

Technical Problem

An object of the present invention is to provide an optical connector assembling jig and method with which an optical connection can be reliably and readily achieved.

Means Used to Solve the Above-Mentioned Problems

To resolve these problems, the present invention provides a jig for performing mechanical splicing to assemble a second optical fiber with an optical connector having an embedded fiber, which is a first optical fiber. The jig comprises a base having an accommodation groove for accommodating the second optical fiber in a longitudinal direction, and a guide for positioning the optical connector, the guide being capable of moving in the longitudinal direction of the base. The base has a rear pressing member for restraining a rear part of the second optical fiber accommodated in the accommodation groove, the rear part being set apart from the connector. The guide has a front holding portion for holding a front part of the second optical fiber accommodated in the accommodation groove, the front part being near the connector. The optical connector assembling jig is configured so that moving the base toward the optical connector causes an intermediate section of the second optical fiber to move away from the accommodation groove and flex, and so that moving the base further toward the optical connector causes the second optical fiber to link with the embedded fiber.

In the optical connector assembling jig according to the present invention, the accommodation groove has preferably a convex shape oriented toward the top part of the base relative to the bottom part. The base preferably has a center pressing member capable of restraining the intermediate section of the second optical fiber accommodated in the accommodation groove. In this case, it is preferable that the center pressing member of the guide is automatically opened up as the base moves forward.

According to another aspect of the present invention, there is provided a method for performing mechanical splicing to assemble a second optical fiber with an optical connector having an embedded fiber which is a first optical fiber. The optical connector assembling jig of the present invention is used in the method. The method comprises moving the base toward the optical connector in a state in which the front part of the second optical fiber is held by a front holding portion and the rear part of the second optical fiber is pressed by the rear pressing member; and connecting the second optical fiber to the embedded fiber by advancing the base further toward the optical connector such that the intermediate section of the second optical fiber bends and separates from the accommodation groove.

Effect of the Invention

With either the optical connector assembling jig according to the present invention or the optical connector assembling method according to the present invention, the second optical fiber which is restrained by the rear pressing member is connected to the embedded fiber inside the optical connector by the repulsive force of the bending at the intermediate section. At this time, the repulsive force is set to an appropriate pressing force of 0.2 N when, e.g., the outside diameter of the second optical fiber is 0.9 mm. It is thereby possible to reliably and readily achieve an optical connection, and to assemble an optical connector.

BEST MODE FOR CARRYING OUT THE INVENTION

Figure 1:
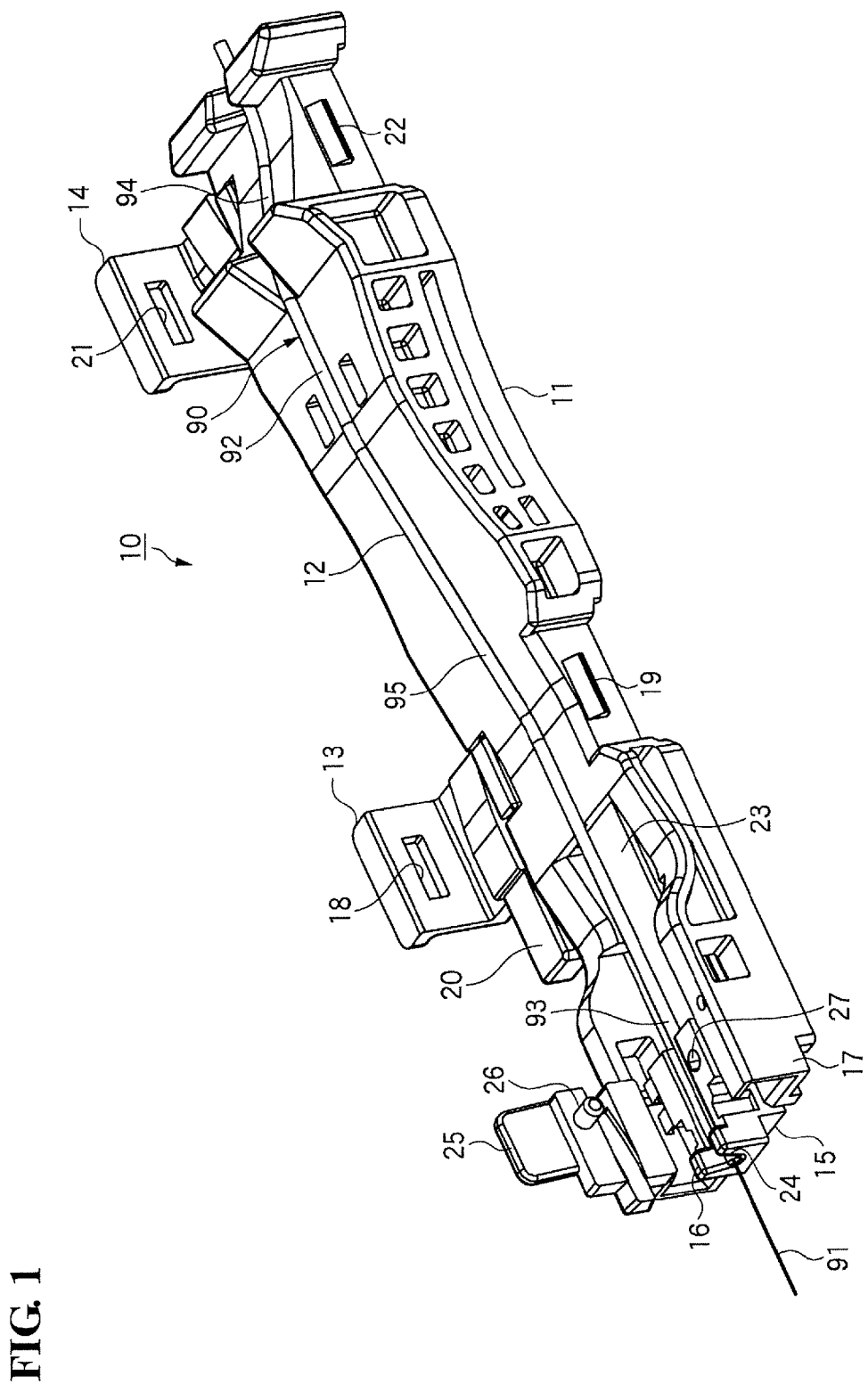
FIG. 1 is a perspective view showing an embodiment of the optical connector assembling jig of the present invention together with a second optical fiber assembled in a connector.

An embodiment of the present invention is described hereinbelow with reference to the accompanying drawings. The drawings are for descriptive purposes, and are not intended to limit the scope of the invention. In the drawings, the same symbols indicate the same components in order to avoid redundancy in the description. The ratios of dimensions in the drawings are not necessarily accurate.

FIG. 1 is a perspective view showing an optical connector assembling jig 10 according to an embodiment of the present invention, together with a second optical fiber 90 assembled in the connector. The assembling jig 10 is composed of a base 11, and a guide 15 located on the connector side of the base 11 and capable of moving in the longitudinal direction of the base. The base 11 has an accommodation groove 12 for accommodating the optical fiber 90. The portion of the optical fiber 90 on the side connected to the optical connector is referred to as "front part 93," the portion of the optical fiber 90 on the top of the base 11 and on the side opposite the optical connector is referred to as "rear part 94," and a center portion of the optical fiber 90 between the front part 93 and the rear part 94 is referred to as the "intermediate section 95." The base 11 further has a center pressing member 13 restraining the intermediate section of the optical fiber 90, and a rear pressing member 14 for restraining the rear part. The guide 15 has a front holding portion 16 for holding the front part of the optical fiber 90.

The optical fiber 90 has a tension member (not shown) made of aramid fiber or the like longitudinally attached around the periphery of a buffered fiber 91 having a covering. A sheath 92 made of PVC or the like is formed around the tension member. According to an example of the specific configuration, the diameter of the buffered fiber 91 is 0.9 mm, and the tension member is made of five aramid fiber bundles, each of which measuring 1140 deniers, wrapped around the periphery of the buffered fiber 91. The sheath 92 is a PVC layer formed to have an inside diameter of 1.2 mm and an outside diameter of 3.0 mm.

It is essential for the tension member not to move in the longitudinal direction relative to the buffered fiber 91 so that the mechanical properties of the optical fiber 90 to be preserved, and also for the optical fiber 90 to be flexible enough for wiring and storage. To prevent movement, the tension member is preferably arranged in a high density on the inside of the sheath within a range in which the mobility of the buffered fiber during springback is not compromised. The sheath is also preferably made thick in order to prevent any loss in transmission properties due to lateral pressure.

Other structural configurations can also be employed in the optical fiber 90. For example, the sheath 92 may be of a two-layer structure. In this case, the materials used for the inner layer and outer layer of the sheath 92 are selected so that the desired elasticity and flame retarded property of these layers are obtained. Having the outer layer made of a PVC that is harder than the inner layer makes it easier for the tension member to be fastened by the sheath 92 and improves the ease of handling.

The optical fiber 90 may also be provided with a tension member between the layers of the sheath 92 in addition to the tension member provided to the periphery of the buffered fiber 91. In this case, increasing the number of tension members improves the tensile strength of the optical fiber 90 and makes the optical fiber easier to handle.

The base 11 is formed in an oblong tabular shape using, e.g., a hard plastic material. The U-shaped accommodating groove 12 is formed in the center of the top surface of the base 11, the width of the accommodating groove 12 being slightly greater than the outside diameter of the optical fiber 90 across the entire length of the base 11. The accommodating groove 12 is formed into a convex shape oriented upward to the top surface of the base 11 relative to the bottom surface. A supplemental jig guiding support 17 having a double-ledge shape is formed in a protruding manner in the front end of the base 11.

The center pressing member 13, which is U-shaped in cross section, is formed from a hard plastic material similar to that used for the base 11. The center pressing member 13 is assembled on the front side of the base 11 so as to be able to open and close via a hinge shaft (not shown). An engaging protuberance 19 in the base 11 engages with an engaging hole 18 provided in a distal end of the center pressing member 13, thereby restraining the optical fiber 90 accommodated in the accommodating groove 12 and immovably holding the optical fiber 90 in the base 11. The center pressing member 13 also has a pressure part 20 for exerting pressure on the guide 15 and causing the guide 15 to come in contact with an optical connector 73 when the base 11 is moved toward the optical connector.

The rear pressing member 14, which is U-shaped in cross section, is formed from a hard plastic material similar to that used for the base 11, and is assembled on the rear end of the base 11 so as to be able to open and close via a hinge shaft (not shown). An engaging protuberance 22 in the base 11 engages with an engaging hole 21 provided in a distal end of the rear pressing member 14, thereby restraining the optical fiber 90 accommodated in the accommodating groove 12 and immovably holding the optical fiber 90 in the base 11.

The guide 15 is formed in the shape of the letter "I" from a hard plastic material similar to that used for the base 11, the front holding portion 16 being provided in the front end of a holding plate 23 that tabular in shape. The front holding portion 16 has in its center a V-shaped optical fiber holding groove 24, and is linked to an optical fiber front pressing member 25.

The front pressing member 25, which is U-shaped in cross section, is formed from a hard plastic material similar to that used for the base 11, and is assembled on the top end of the front holding portion 16 so as to be able to open and close via a hinge shaft (not shown). An engaging protuberance 26 provided in a distal end of the front pressing member 25 engages with an engaging hole 27 provided in the front holding portion 16. The optical fiber 90 held in the holding groove 24 of the front holding portion 16 is thereby attached to the front holding portion 16 while being prevented from rising upward.

Figure 2:
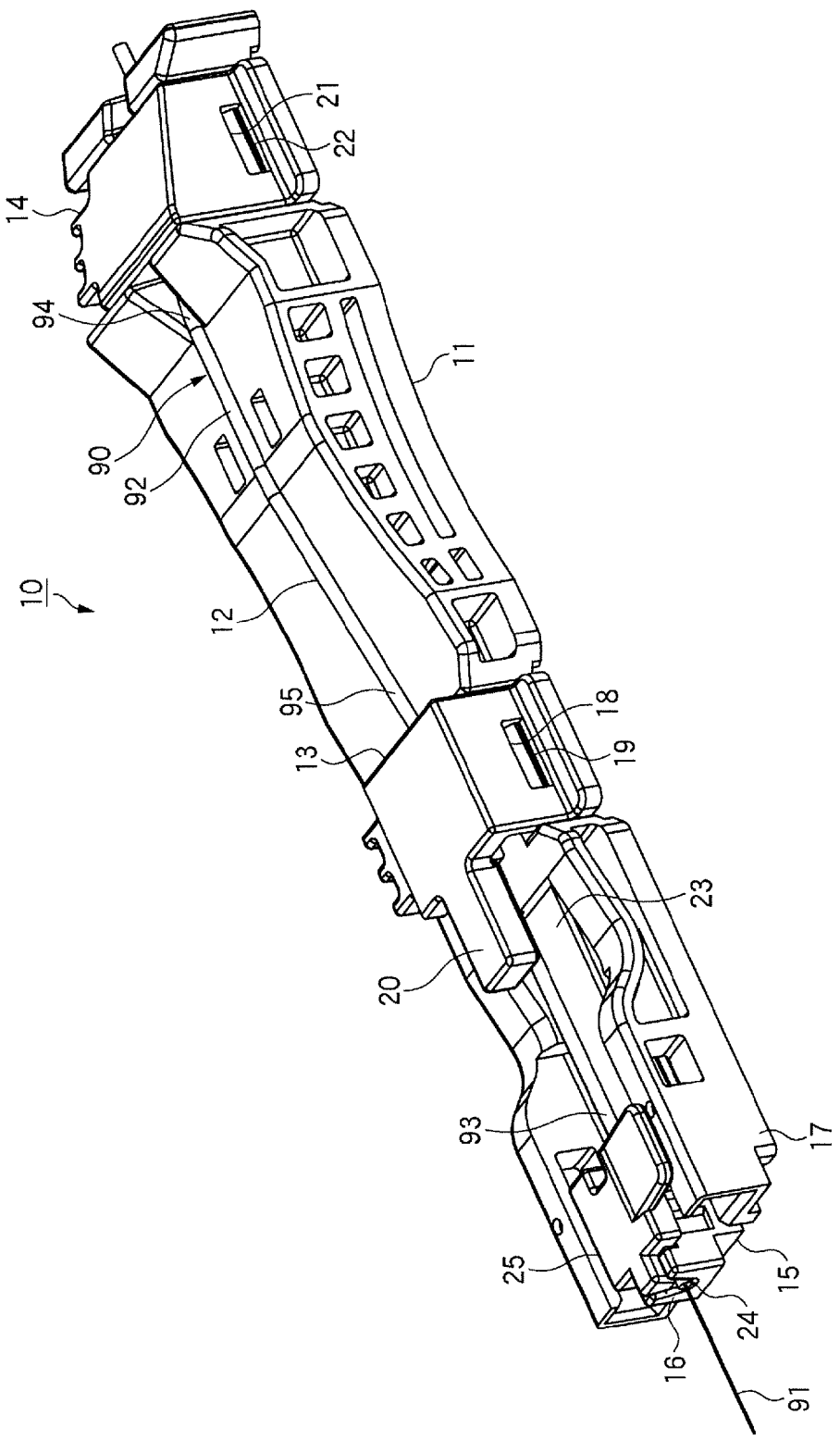
FIG. 2 is a perspective view for describing a first step in an embodiment of the optical connector assembling method of the present invention.
Figure 3:
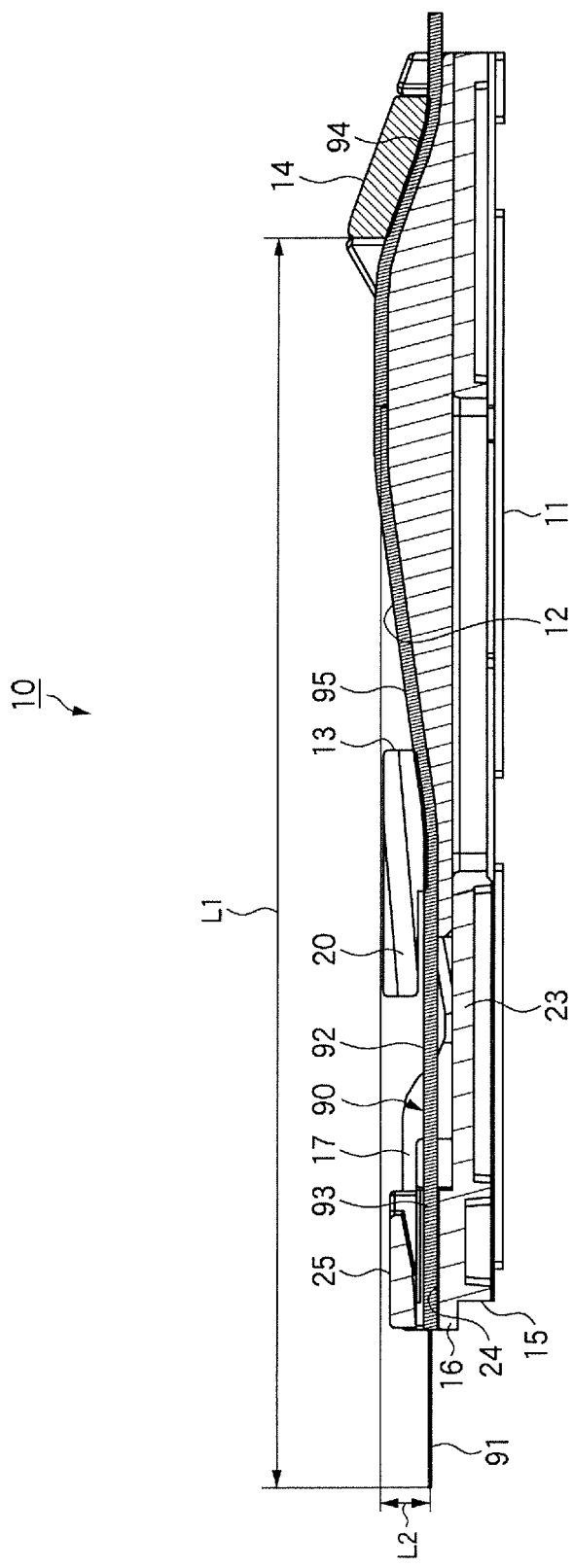
FIG. 3 is a longitudinal cross-sectional view of FIG. 2.

There follows a detailed description of the optical connector assembling jig 10 and of the optical connector assembling method, with reference being made to FIGS. 2 through 13. FIG. 2 is a perspective view for describing a first step in the embodiment of the optical connector assembling method. FIG. 3 is a longitudinal cross-sectional view of the same. In the first step, the optical fiber 90 is accommodated in the accommodating groove 12; and the center pressing member 13, the rear pressing member 14 and the front pressing member 25 are closed. At this time, the optical fiber 90 is held in the holding groove 24 of the front holding portion 16, the sheath 92 at the distal end thereof is removed, and the exposed distal end of the buffered fiber 91 is cut to a predetermined length.

As a result, the optical fiber 90 is set to a length L1 from the distal end to the rear part 94, and the accommodating groove 12 causes the intermediate section 95 to bend from the front part 93 to a height L2. The optical fiber 90 is thereby bent into a convex shape oriented toward the top of the base 11 relative to the bottom, and is held in the accommodating groove 12; therefore, when pressed in, the fiber only bends upward relative to the base 11.

Figure 4:
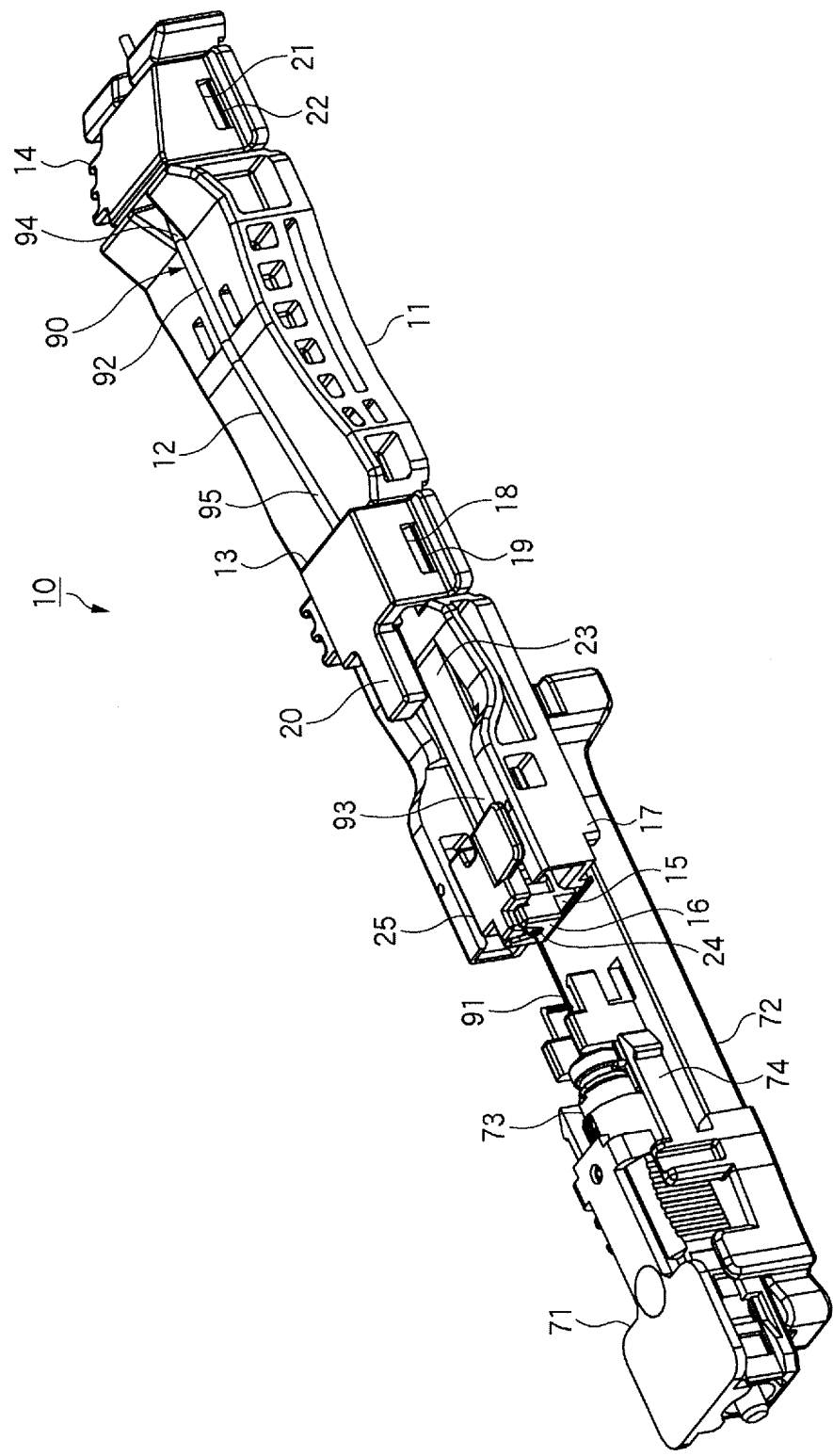
FIG. 4 is a perspective view for describing a second step in an embodiment of the optical connector assembling method of the present invention.
Figure 5:
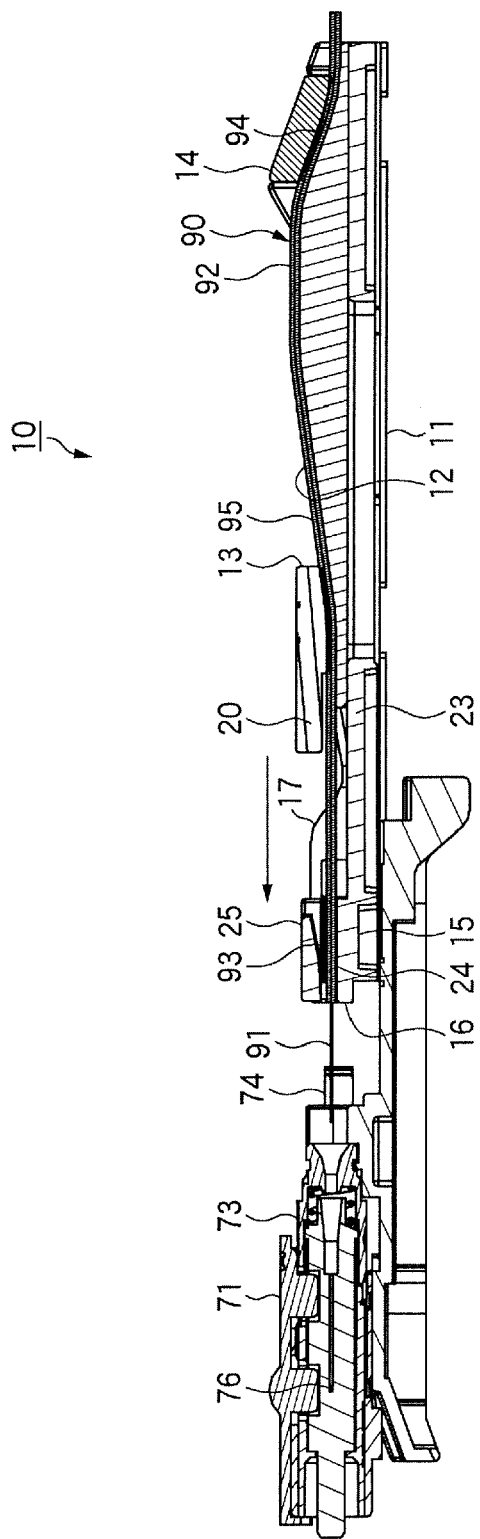
FIG. 5 is a longitudinal cross-sectional view of FIG. 4.

FIG. 4 is a perspective view for describing the second step in the optical connector assembling method of the present embodiment. FIG. 5 is a longitudinal cross-sectional view of the same. In the second step, the assembling jig 10 is arranged on top of a supplemental jig 72, on which the optical connector 73 is assembled with a wedge member 71 disposed therebetween. The buffered fiber 91 of the optical fiber 90 is thereby positioned in an optical fiber insertion hole 74 of the optical connector 73.

Figure 6:
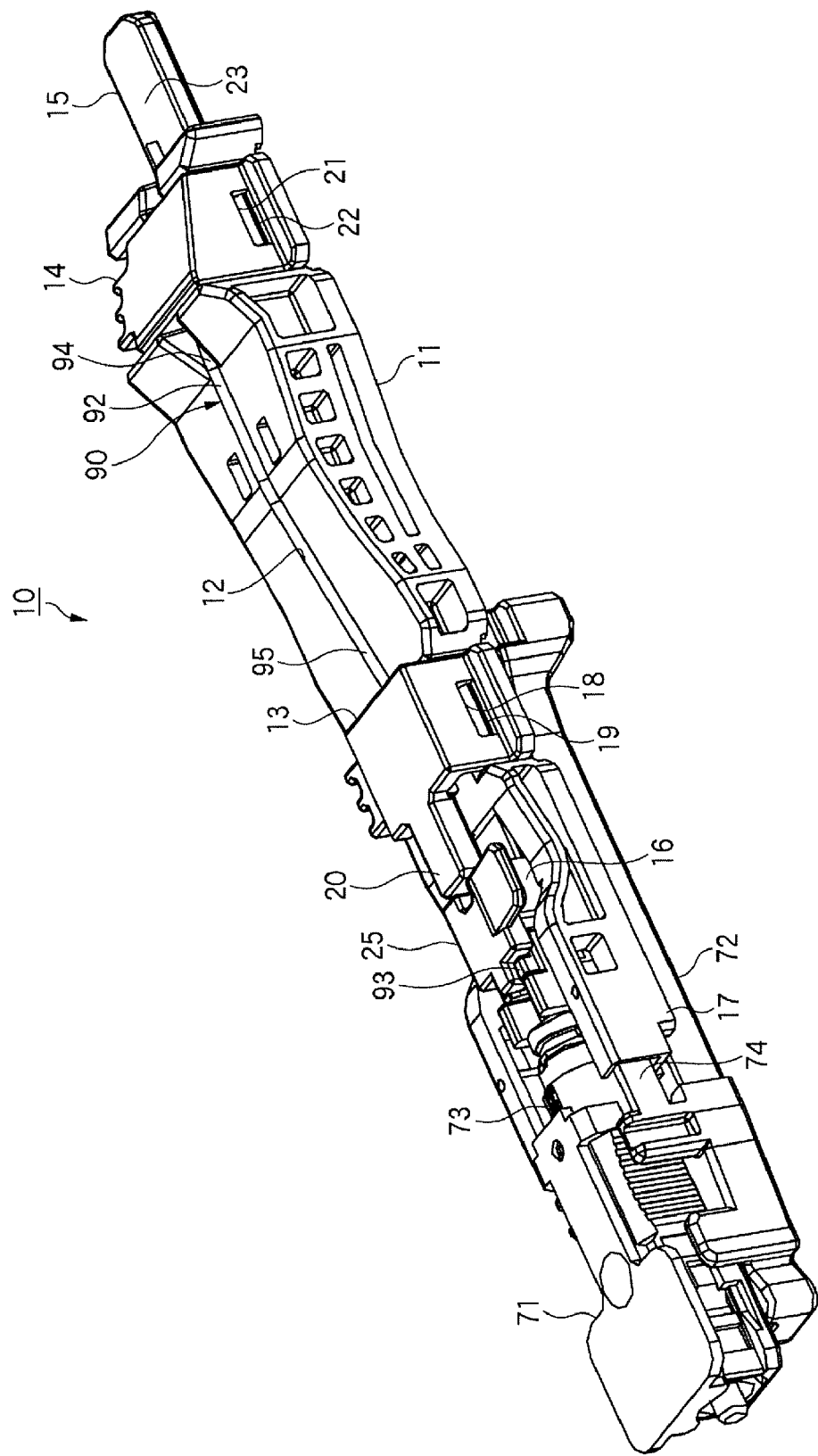
FIG. 6 is a perspective view for describing a third step in an embodiment of the optical connector assembling method of the present invention.
Figure 7:
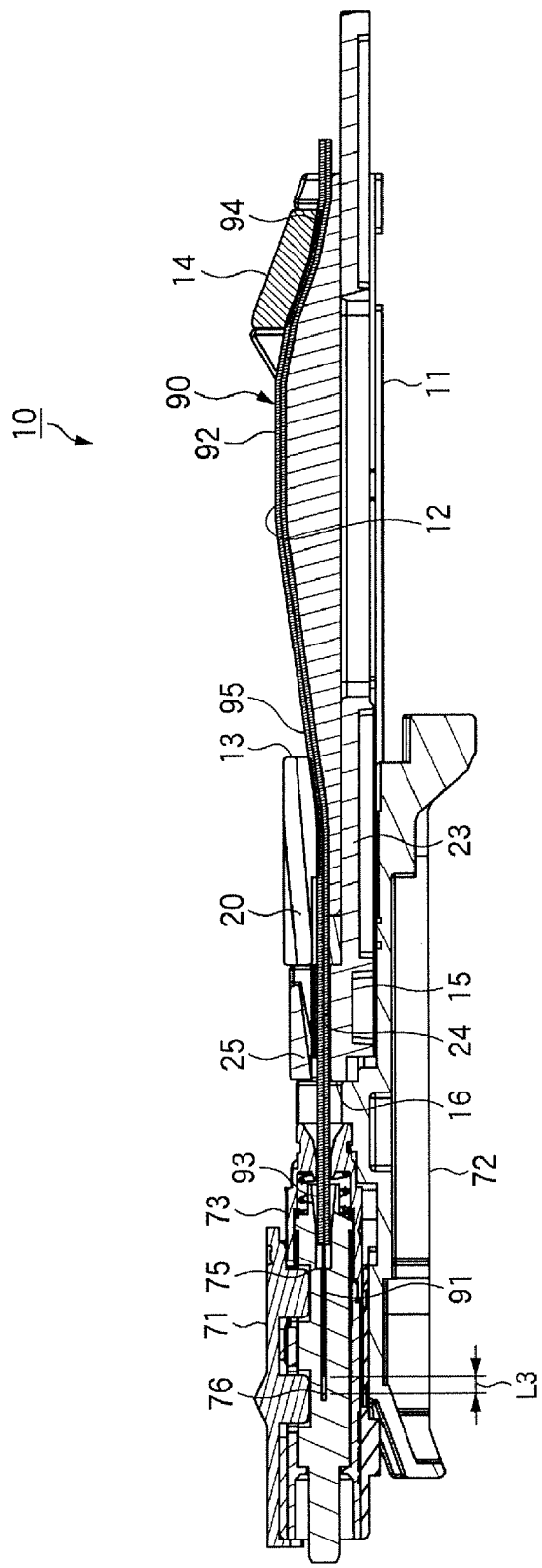
FIG. 7 is a longitudinal cross-sectional view of FIG. 6.

FIG. 6 is a perspective view for describing the third step in the optical connector assembling method of the present embodiment. FIG. 7 is a longitudinal cross-sectional view of the same. In the third step, the assembling jig 10 disposed on top of the supplemental jig 72 is moved toward the optical connector 73. Since the base 11 moves toward the optical connector 73, the supplemental jig guiding support 17 of the base 11 is progressively inserted through a guide protuberance 75 of the supplemental jig 72. The front pressing member 25 of the guide 15 is pressed forward by the pressure part 20 of the center pressing member 13 of the base 11, and the front pressing member 25 is brought in contact with an end part of the supplemental jig 72.

At this time, the sheath 92 of the optical fiber 90 is inserted into an optical fiber insertion hole 74 of the optical connector 73. The buffered fiber 91 approaches an embedded fiber 76 inside the optical connector 73 up to a separation distance L3.

Figure 8:
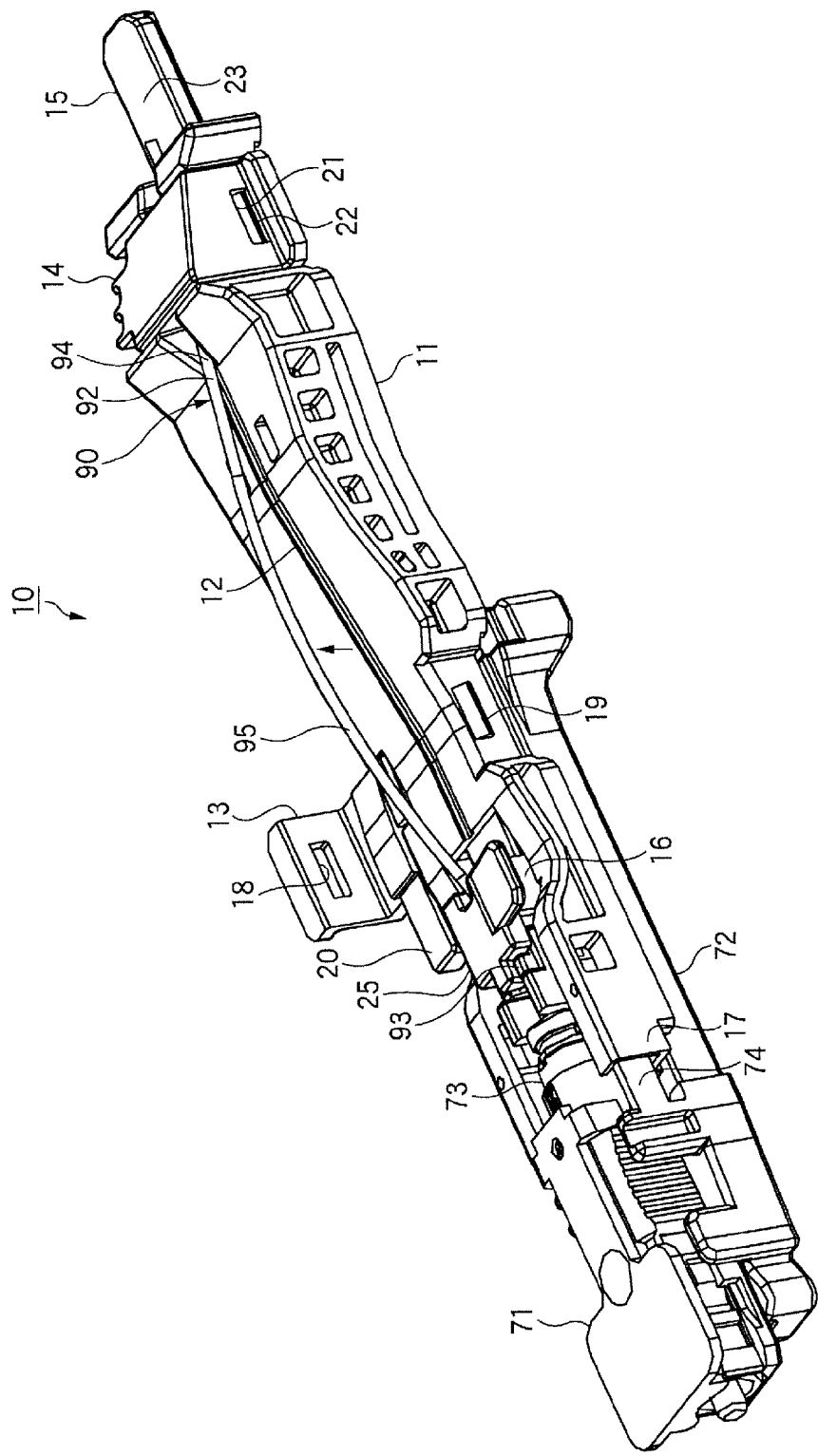
FIG. 8 is a perspective view for describing a fourth step in an embodiment of the optical connector assembling method of the present invention.
Figure 9:
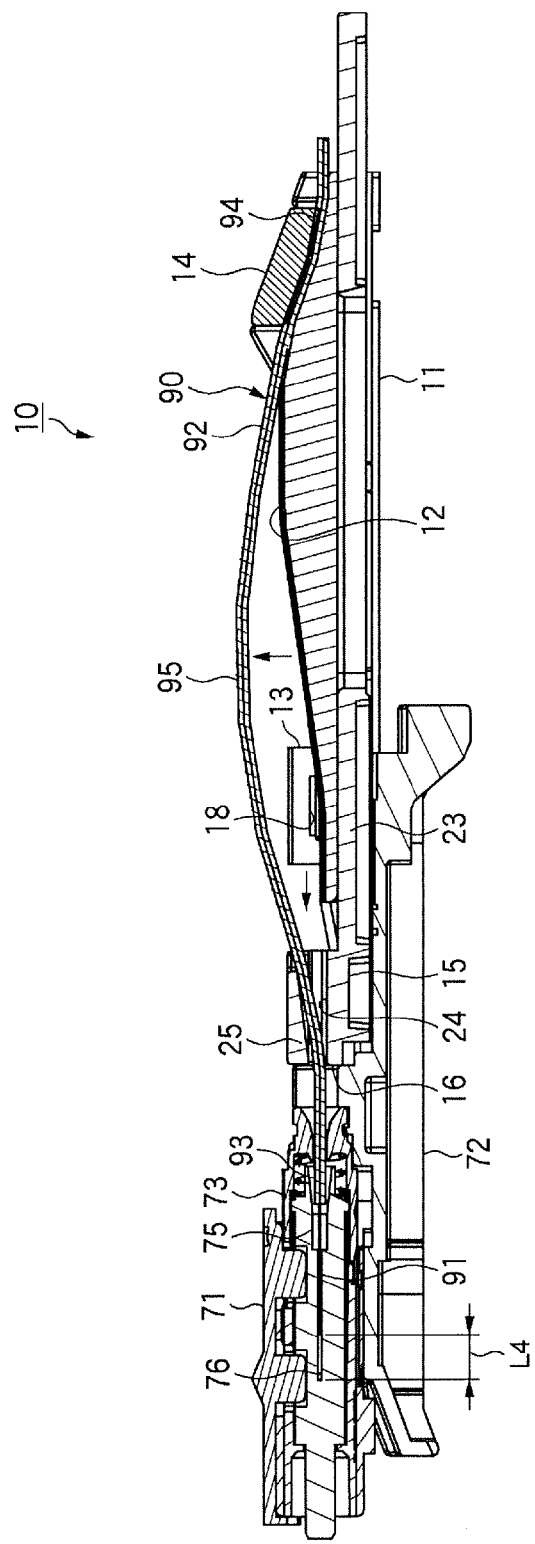
FIG. 9 is a longitudinal cross-sectional view of FIG. 8.

FIG. 8 is a perspective view for describing the fourth step in the optical connector assembling method of the present embodiment. FIG. 9 is a longitudinal cross-sectional view of the same. In the fourth step, the center pressing member 13 of the base 11 is opened up. The optical fiber 90 is thereby pulled out of the accommodation groove 12 and is made to curve and flex upward of the base 11 in a state in which the rear part 94 is restrained by the rear pressing member 14. At this time, the buffered fiber 91 inserted through the optical fiber insertion hole 74 of the optical connector 73 is separated from the embedded fiber 76 inside the optical connector 73 by a separation distance L4 that is greater than the separation distance L3.

Figure 10:
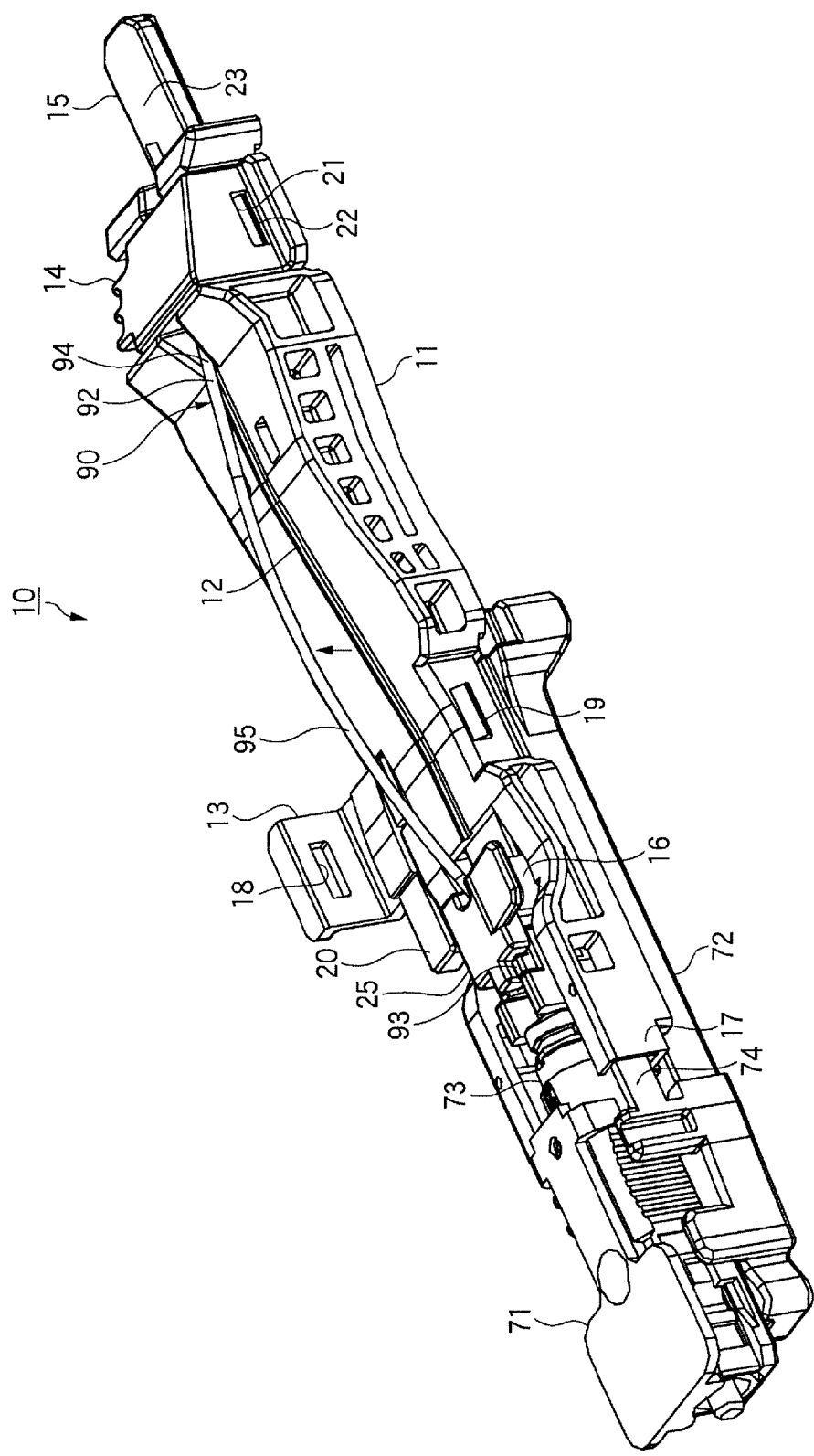
FIG. 10 is a perspective view for describing a fifth step in an embodiment of the optical connector assembling method of the present invention.
Figure 11:
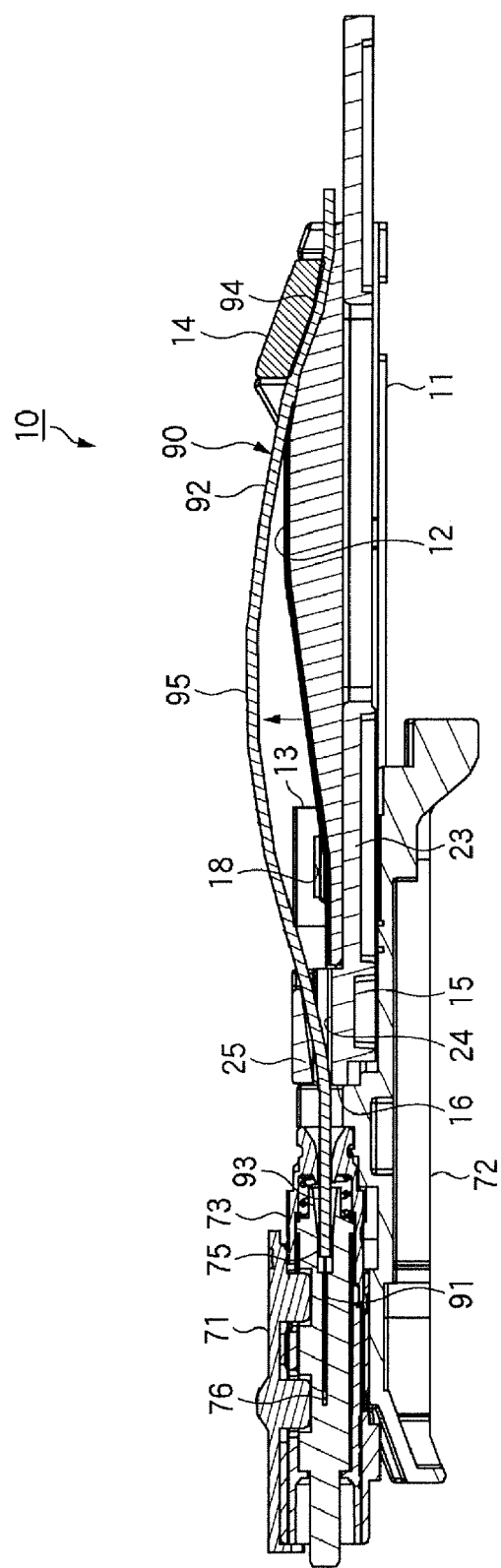
FIG. 11 is a longitudinal cross-sectional view of FIG. 10.

FIG. 10 is a perspective view for describing the fifth step in the optical connector assembling method of the present embodiment. FIG. 11 is a longitudinal cross-sectional view of the same. In the fifth step, the assembling jig 10 on the supplemental jig 72 moves closer to the optical connector 73 in proportion to the space formed by the opening up of the center pressing member 13. The optical fiber 90 whose rear part 94 is restrained by the rear pressing member 14 thereby advances further toward the optical connector 73.

The supplemental jig guiding support 17 of the base 11 is thereby joined to the guide protuberance 75 of the supplemental jig 72, and the intermediate section 95 of the optical fiber 90 bends to a greater degree. The buffered fiber 91 is moved nearer to the embedded fiber 76 inside the optical connector 73 by the repulsive force accompanying the bending of the intermediate section 95. The distal end of the buffered fiber 91 is mechanically spliced with the embedded fiber 76.

Figure 12:
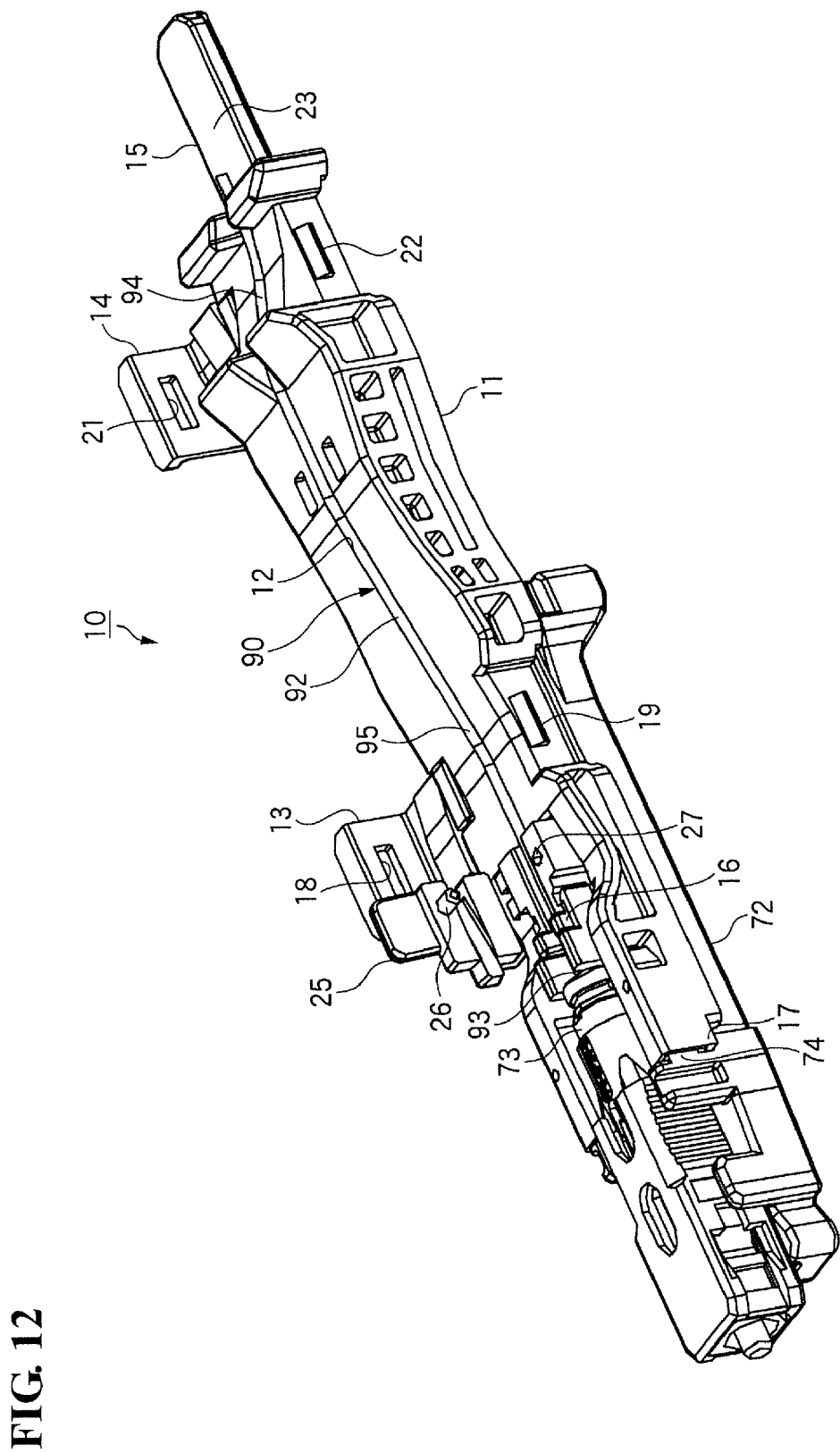
FIG. 12 is a perspective view for describing a sixth step in an embodiment of the optical connector assembling method of the present invention.
Figure 13:
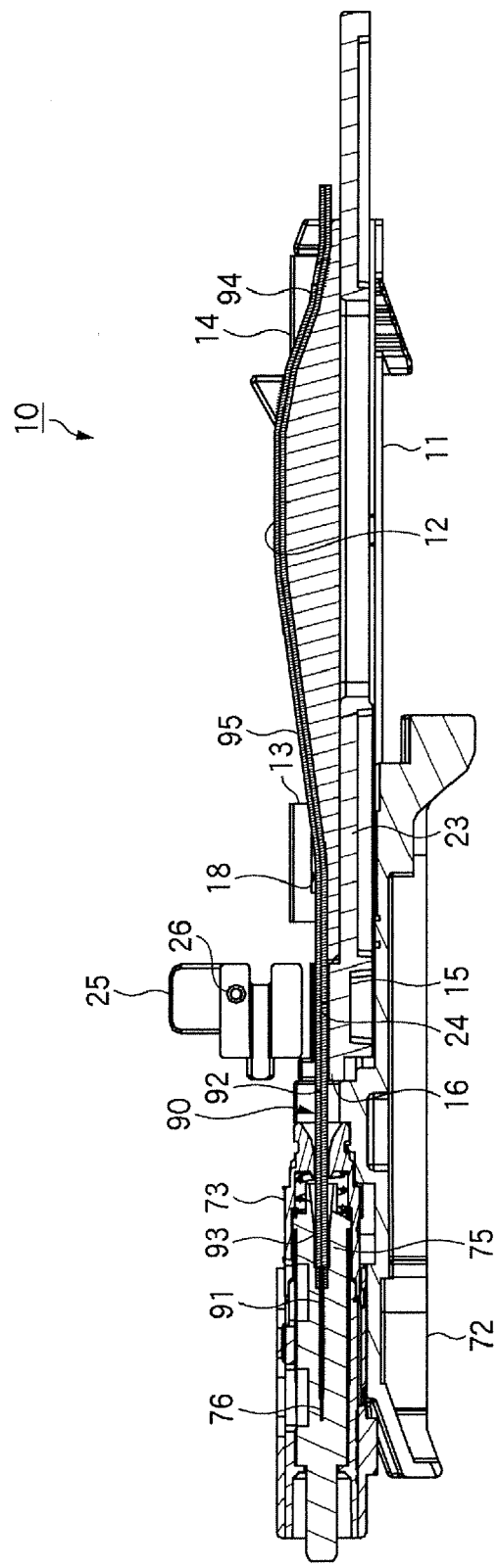
FIG. 13 is a longitudinal cross-sectional view of FIG. 12.

FIG. 11 is a perspective view for describing the sixth step in the optical connector assembling method of the present embodiment. FIG. 12 is a longitudinal cross-sectional view of the same. In the sixth step, which is the last step, the optical fiber 90, which is optically connected to the embedded fiber 76 of the optical connector 73, is removed from the assembling jig 10. In addition to the already-opened center pressing member 13, the rear pressing member 14 and the front pressing member 25 are also opened up. The optical fiber 90 connected to the optical connector 73 can be removed by removing the wedge member 71 from the supplemental jig 72.

Figure 14:
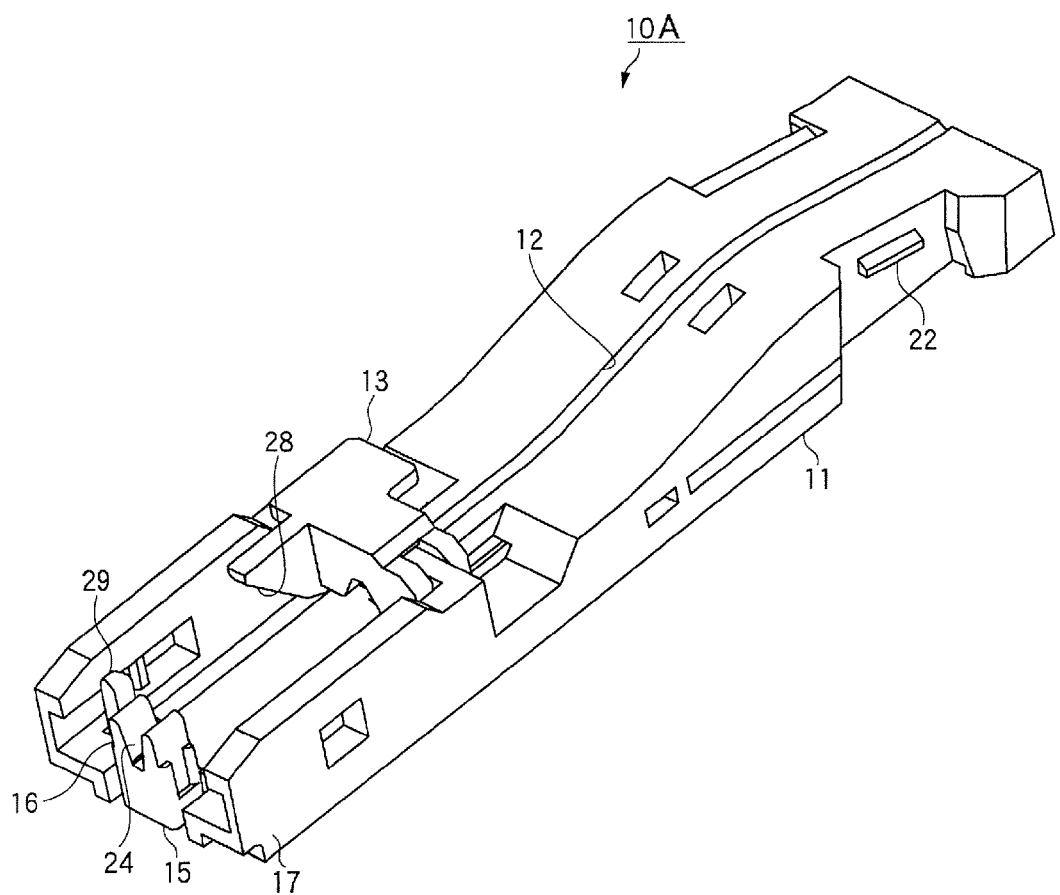
FIG. 14 is a perspective view showing a modification of the embodiment of the optical connector assembling jig of the present invention.
Figure 15:
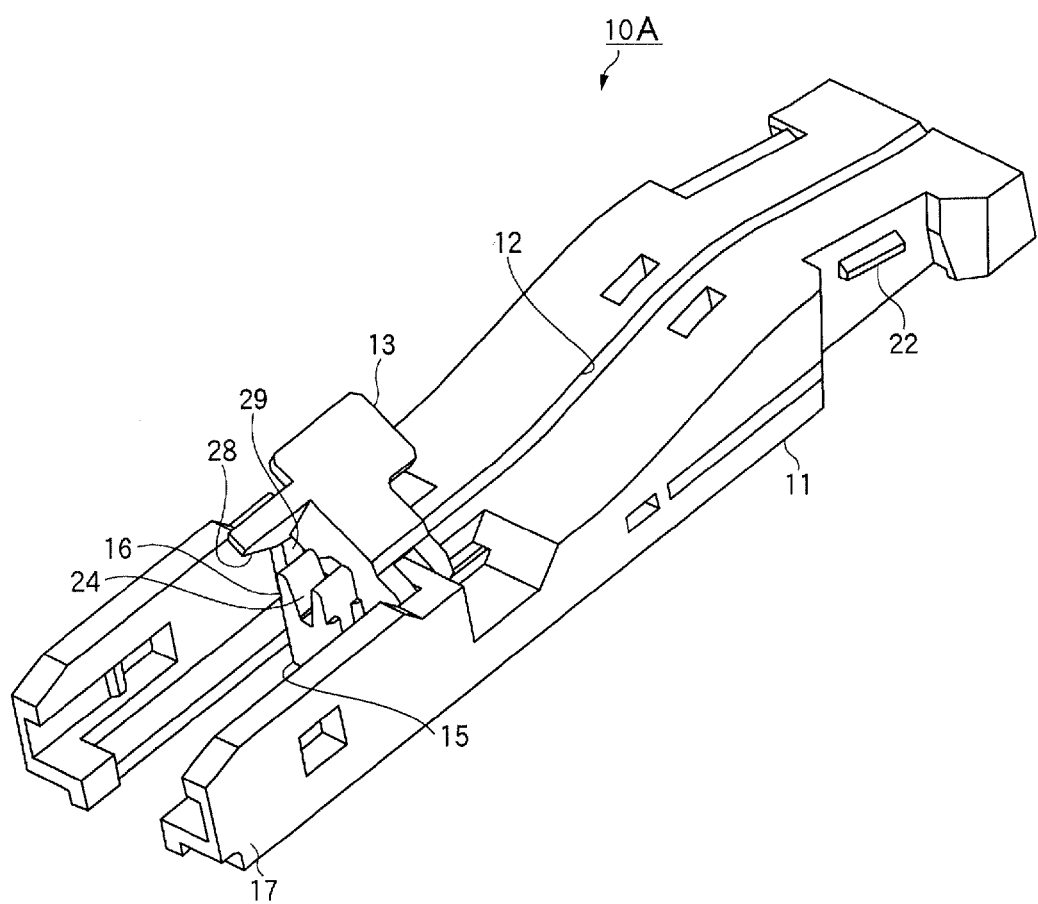
FIG. 15 is an external perspective view corresponding to the sixth step of the optical connector assembling method in which the optical connector assembling jig of the modification is used.
Figure 16:
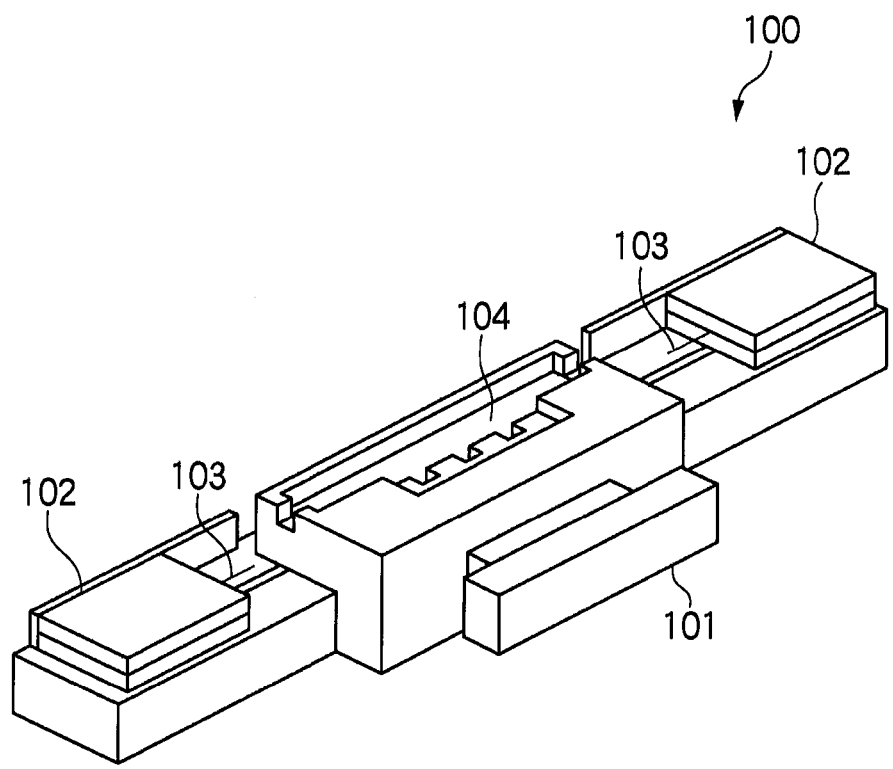
FIG. 16 is a schematic view of a conventional optical connector assembling jig.

There now follows a description of an optical connector assembling jig 10A that is a modification of the embodiment of the present invention. FIG. 14 is a perspective view showing the optical connector assembling jig 10A. FIG. 15 is an external perspective view of the sixth step of an optical connector assembling method in which the optical connector assembling jig 10A is used. In FIGS. 14 and 15, the optical fiber 90 and the rear pressing member 14 are omitted. An inclined contact surface 28 is formed at a forward incline in the center pressing member 13 of the base 11 of the assembling jig 10A. The front holding portion 16 of the guide 15 is also provided with a contact protuberance 29 for contacting the inclined contact surface 28 and automatically opening up the center pressing member 13 when the base 11 is advanced toward the optical connector.

As described above, according to the optical connector assembling jigs 10 and 10A, the repulsive force of the bending at the intermediate section 95 is used to cause the optical fiber 90 restrained by the rear pressing member 14 to be connected to the embedded fiber 76 inside the optical connector 73. At this time, the repulsive force is set to an appropriate pressing force of 0.2 N when, e.g., the outside diameter of the optical fiber 90 is 0.9 mm. A reliable optical connection can thereby be achieved.

In the assembling jig 10, since the accommodation groove 12 is formed into a shape that bends in a convex shape from the bottom part to the top part of the base 11, the optical fiber 90 is held so as to curve from the bottom part to the top part of the base 11 when accommodated in the accommodation groove 12. When the base 11 is advanced toward the optical connector 73 after the rear part 94 has been pressed by the rear pressing member 14, the optical fiber 90 is pulled out of the accommodation groove 12 and is curved and bent further from the top part of the base 11. A predetermined amount of repulsive force can thereby be obtained in the optical fiber 90.

Since the assembling jig 10 has the center pressing member 13, the intermediate section 95 of the optical fiber 90 accommodated in the accommodation groove 12 of the base 11 is restrained by the center pressing member 13, and the base 11 is moved toward the optical connector 73. Releasing the restraint made on the optical fiber 90 by the center pressing member 13 enables repulsive force to be obtained in the optical fiber 90, which is then allowed to flex efficiently.

According to the assembling jig 10A of the modification, in which the center pressing member 13 automatically opens as the base 11 advances, the restraint placed on the intermediate section 95 of the optical fiber 90 can be released in an extremely simple manner.

According to the optical connector assembling method of the embodiment of the present invention, the repulsive force of the optical fiber 90 restrained by the rear pressing member 14 is used to connect the optical fiber 90 to the embedded fiber 76 inside the optical connector 73. At this time, assuming the outside diameter of the optical fiber 90 is 0.9 mm, the fibers will be connected with an appropriate pressure force of 0.2 N. An optical connection can thereby be reliably and readily achieved.

The present application is based on a Japanese Patent Application filed on May 9, 2008 (Patent Application No. 2008-123631), the contents of which are incorporated herein by reference.

INDUSTRIAL APPLICABILITY

The present invention is useful for assembling an optical fiber into a connector, the optical fiber being wired in the home of a user.

What is claimed is:

1. An optical connector assembling jig for performing mechanical splicing to assemble a second optical fiber in an optical connector having an embedded fiber that is a first optical fiber, the jig comprising:
    a base provided in a longitudinal direction with an accommodation groove for accommodating the second optical fiber, the accommodation groove being formed into a convex shape oriented upward to a top surface of the base relative to a bottom surface of the base; and
    a guide for positioning the optical connector, the guide being capable of moving in the longitudinal direction of the base;
    the base having a rear pressing member for restraining a rear part of the second optical fiber accommodated in the accommodation groove, the rear part being set apart from the connector, and
    the guide having a front holding portion for holding a front part of the second optical fiber accommodated in the accommodation groove, the front part being near the connector,
    wherein the convex shape of the accommodation groove is such that a portion of the second optical fiber is bent upward relative to the base when the second optical fiber is pressed into the accommodation groove.

2. The optical connector assembling jig according to claim 1, wherein
    the base has a center pressing member capable of restraining an intermediate section of the second optical fiber accommodated in the accommodation groove.

3. The optical connector assembling jig according to claim 2, wherein
    the center pressing member of the guide is automatically opened up by the base advancing.

4. A method for performing mechanical splicing to assemble a second optical fiber in an optical connector having an embedded fiber that is a first optical fiber, the method comprising the following steps, performed using an optical connector assembling jig having a base provided in a longitudinal direction with an accommodation groove for accommodating the second optical fiber, the accommodation groove is formed into a convex shape oriented upward to a top surface of the base relative to a bottom surface of the base, and a guide for positioning the optical connector, the guide being capable of moving in the longitudinal direction of the base, the base having a rear pressing member for restraining a rear part of the second optical fiber accommodated in the accommodation groove, the rear part being set apart from the connector, and the guide having a front holding portion for holding a front part of the second optical fiber accommodated in the accommodation groove, the front part being near the connector:
    moving the base toward the optical connector in a state in which the front part of the second optical fiber is held by the front holding portion, and the rear part of the second optical fiber is pressed by the rear pressing member; and
    connecting the second optical fiber to the embedded fiber by advancing the base further toward the optical connector such that the intermediate section of the second optical fiber bends and separates from the accommodation groove, wherein the convex shape of the accommodation groove is such that a portion of the second optical fiber is bent upward relative to the base when the second optical fiber is pressed into the accommodation groove.

* * * * *